United States Patent [19]
Parker et al.

[11] Patent Number: 5,924,697
[45] Date of Patent: Jul. 20, 1999

[54] DOUBLE GAS SEAL WITH BELLOWS SUPPORTED BY BACKING AND SUPPORT RINGS

[75] Inventors: Joseph C. Parker, Otsego; Christopher D. McCowey, Portage; William V. Adams, Scotts, all of Mich.

[73] Assignee: Durametallic Corporation, Kalamazoo, Mich.

[21] Appl. No.: 08/943,617

[22] Filed: Oct. 3, 1997

Related U.S. Application Data

[63] Continuation-in-part of application No. 08/810,295, Mar. 3, 1997.

[51] Int. Cl.[6] ............................................. F16J 15/34
[52] U.S. Cl. ........................... 277/369; 277/361; 277/389
[58] Field of Search ................................. 277/361, 369, 277/377, 379, 385, 387, 389, 390, 391, 392, 393, 400, 927

[56] References Cited

U.S. PATENT DOCUMENTS

| | | | |
|---|---|---|---|
| 2,420,556 | 5/1947 | Mueller | 277/363 X |
| 3,079,605 | 2/1963 | Thomas et al. | 277/369 |
| 3,333,856 | 8/1967 | Voitik | 277/363 X |
| 3,372,076 | 3/1968 | Wilkinson | 277/393 X |
| 3,475,033 | 10/1969 | Voitik | 277/387 |
| 3,575,424 | 4/1971 | Taschenberg | 277/411 |

(List continued on next page.)

FOREIGN PATENT DOCUMENTS

| | | | |
|---|---|---|---|
| 1 586 226 | 2/1970 | France | 29/454 |

OTHER PUBLICATIONS

"A New Shaft Sealing Solution for Small Cryogenic Pumps", C.P. Morrissey, John Crane EAA, United Kingdom, Feb. 5, 1996 as previously–submitted (5 pages).

EG&G Sealol Industrial Division, "Non–Contacting Welded Metal Bellows Seal for Process Equipment" Type 1010 brochure, Dec. 1996, (6 pages).

Enlargement of Type 1010 gas seal, from p. 5 of EG&G Sealol Industrial Division, "Non–Contacting Welded Metal Bellows Seal for Process Equipment" Type 1010 brochure, Dec. 1996.

*Primary Examiner*—Lynne A. Reichard
*Assistant Examiner*—Greg Binda
*Attorney, Agent, or Firm*—Flynn, Thiel, Boutell & Tanis, P.C.

[57] ABSTRACT

An improved gas seal having inboard and outboard seal units each defined by a pair of opposed and relatively rotatable seal faces, one face of each pair having appropriate grooves which communicate with a pressurized barrier gas, preferably an inert gas such as nitrogen. The inboard seal unit, at its other seal periphery, communicates with a process fluid being handled by a rotating equipment, namely a pump. Each seal unit has one of the seal rings, the nonrotating ring in the preferred embodiment, urged axially toward its opposed ring by a compact bellows which axially cooperates between the respective seal ring and a backing member. The bellows is positioned to create an isolation between the barrier and process fluids and to provide an effective diameter to provide desirable balance of pressures as imposed on the axially moving seal ring to optimize seal performance. The bellows at one end is connected to a support ring which is urged toward the adjacent seal ring with an annular gasket maintaining a soft sealed contact therebetween. The other end of the bellows is connected to a pressure piston which seats against a stationary gland. The process fluid urges the pressure piston into contact with the support ring to increase the sealing pressure at the gasket in the event of an improper balance between the pressures of the barrier and process fluids.

21 Claims, 4 Drawing Sheets

U.S. PATENT DOCUMENTS

| | | | |
|---|---|---|---|
| 3,805,882 | 4/1974 | Vallance | 277/360 |
| 3,880,434 | 4/1975 | Echard et al. | 277/361 X |
| 3,988,026 | 10/1976 | Kemp, Jr. | 277/369 |
| 4,013,297 | 3/1977 | Smith | 277/365 |
| 4,071,253 | 1/1978 | Heinen et al. | 277/369 |
| 4,123,069 | 10/1978 | Sato | 277/391 |
| 4,136,887 | 1/1979 | Wentworth, Jr. | 277/374 |
| 4,183,541 | 1/1980 | Wentworth, Jr. | 277/379 |
| 4,365,816 | 12/1982 | Johnson et al. | 277/392 |
| 4,721,311 | 1/1988 | Kakabaker | 277/369 |
| 4,749,200 | 6/1988 | Sehnal et al. | 277/392 |
| 5,149,249 | 9/1992 | Schellong et al. | 277/369 |
| 5,490,679 | 2/1996 | Borrino et al. | 277/369 |
| 5,496,047 | 3/1996 | Goldswain et al. | 277/400 |
| 5,544,897 | 8/1996 | Di Pietro et al. | 277/389 |

DOUBLE GAS SEAL WITH BELLOWS SUPPORTED BY BACKING AND SUPPORT RINGS

CROSS REFERENCE TO RELATED APPLICATION

This application is a continuation-in-part of copending application Ser. No. 08/810 295, filed Mar. 3, 1997, and entitled "DOUBLE GAS SEAL". The disclosure of this Ser. No. 08/810 295 application is, in its entirety, incorporated herein by reference.

FIELD OF THE INVENTION

This invention relates to an improved face-type seal for creating a sealed relationship between a housing and a rotatable shaft and, more particularly, to a compact double bellows gas seal which is particularly desirable for use on pumps, specifically pumps of the type having a small stuffing box or chamber.

BACKGROUND OF THE INVENTION

Numerous variations of opposed face-type seals, often referred to as mechanical seals, have been developed for use in creating a sealed relationship between a rotatable shaft and a surrounding housing. Such seals, including those of the type which are often referred to as gas seals, are conventionally positioned within a stuffing box or seal chamber which is defined within the housing in surrounding relationship to the shaft. In many types of equipment requiring use of such seals, however, and particularly pumps, the stuffing box or seal chamber is of an extremely small size (that is, the stuffing box is of a small radial clearance as measured between the inner diameter of the surrounding housing and the outer diameter of the rotatable shaft). For example, large numbers of pumps often referred to as ANSI pumps provide only about 5/16 to 3/4 inch radial bore clearance for accommodating the seal or packing, and positioning an effective opposed face-type seal in such small space has generally been extremely difficult, and hence other types of sealing or packing arrangements have often been utilized on pumps having small packing or stuffing box chambers (such pumps often being referred to as having small bore seal chambers). The problem is further complicated by the fact that such pumps, adjacent the end of the stuffing box, also generally provide little available space for mounting a seal exteriorly of the stuffing box.

While numerous mechanical seals of the opposed face type have been developed and utilized on fluid handling equipment including pumps, nevertheless most such seals have been undesirably large, both radially and axially, and hence have not been suitable for adaptation to and use on small bore pumps. For example, numerous double mechanical seals have been developed, including not only contacting face-type, but also gas seals which include both contacting and non-contacting face types. These known seals, however, in addition to exhibiting the conventional largeness which restricts their application to small-bore pumps, have also conventionally possessed the recognized problems of secondary seal hang-up and incompatibility of O-rings with the pumped fluid. In an effort to eliminate or minimize these latter problems, many of the known mechanical seals of both the gas and non-gas types have employed metal bellows to eliminate the O-rings as secondary seals and thus attempt to minimize the secondary seal hang-up and seal ring compatibility problems. The seals employing metal bellows, however, have generally employed rather large complex bellows arrangements which have typically employed multiple bellows convolutions provided with retaining flanges or elements at opposite ends, which retaining flanges in turn are either pressed, fitted or otherwise fixedly secured to the adjacent members of the seal assembly. These bellows have hence significantly increased the structural and manufacturing complexity of the seal assembly, and have resulted in the seal assembly being of significant size, particularly with respect to axial length. Such seal bellows also make it difficult to achieve a predictable and maintainable balance diameter when the bellows is subjected to the pressures of the pump process fluid on one side and a barrier fluid on the other side, and hence this inability to maintain an accurate balance diameter can cause variations in the balance pressure and accordingly can effect the amount of fluid which escapes or passes between the opposed seal faces, particularly in a non-contacting-type gas seal.

The use of conventional bellows in known seals, as discussed above, further complicates the proper application of forces to the seal rings, particularly with respect to the application of these forces relative to the centroids of the seal rings, and thus maintaining proper convergence and hence proper opposed contacting or adjacent relationship between the opposed seal faces is further complicated. The fact that many of the known bellows also have a collar at one end which typically has a shrink fit onto the seal ring also induces additional stresses into the seal ring which can interfere with proper seal ring configuration and hence can affect the proper convergence of the seal faces.

In the conventional bellows-type seals, particularly double seal units which utilize an intermediate chamber containing a barrier fluid for isolating the sealed product from the environment, the problem of providing an effective and compact sealing relationship is further complicated by the fact that the barrier fluid and product pressures act on opposite sides of the bellows associated with the inboard seal unit, and in those rare situations where a failure of barrier fluid pressure occurs, maintaining an effective seal between the product and barrier chamber is complicated by the excessive unbalanced product pressure which exists on the inboard seal unit and which can cause undesired contact pressures and distortion forces so that maintaining an effective seal under this condition becomes even more difficult to achieve.

Accordingly, it is an object of this invention to provide an improved bellows-type face seal, particularly a double gas seal, having a desirably small and compact configuration so as to be particularly adaptable for use on pumps having small bore seal chambers, which improved seal is believed to overcome many of the disadvantages associated with conventional seals as briefly summarized above.

More specifically, this invention relates to an improved gas seal having inboard and outboard seal units each defined by a pair of opposed and relatively rotatable seal faces, one face of each pair having appropriate grooves which communicate on one seal periphery with a pressurized barrier gas, preferably an inert gas such as nitrogen. The inboard seal unit, at its other seal periphery, communicates with the process fluid being handled by the rotating equipment, namely the pump. At least the inboard seal unit has one of the seal rings, the nonrotating ring in the preferred embodiment, urged axially toward its opposed ring by a compact bellows which axially cooperates between the respective seal ring and a backing member. The bellows is positioned to create an isolation between the barrier and process fluids and to provide a mean effective diameter to provide desirable balance of pressures as imposed on the axially moving seal ring to optimize seal performance.

In the improved seal of this invention, as aforesaid, the bellows is of a minimum number of convolutions, such as about three to five convolutions in the preferred embodiment, each defined by two bellow plates or leaflets which are sealingly engaged along one radial edge with the leaflets of adjacent convolutions being sealingly engaged along the other radial edge. The bellows at one end is joined to a support ring which in turn concentrically supports the stationary seal face. A deformable or elastomeric seal element or gasket is axially and sealingly compressed between the support ring and seal face. This compressible seal ring is preferably disposed so that it is at least slightly outside the mean pressure diameter of the bellows to provide the desired pressure balance on the seal ring. The opposite or outer end of the bellows is joined to a balance piston which is axially slidably supported on the surrounding stationary housing or gland. The balance piston has a rear face exposed to the product pressure, and in addition has a front face which is exposed to the barrier pressure so that the latter normally maintains; the balance piston in a position of abutment with the stationary gland or housing. The balance piston is normally axially spaced from the face ring, and has a face part which is axially aligned with but normally spaced from the support ring. Upon failure or absence of barrier pressure, or if the process pressure improperly exceeds the barrier pressure during an operating excursion, the process pressure acting against the rear face of the balance piston causes the latter to slide axially toward the face ring causing limited compression of the bellows until the face part of the balance piston abuts the support ring, whereby process pressure applied to the balance piston is then transferred onto the support ring and through the compressible seal ring for application to the face ring. All forces applied to the face ring to maintain the seal faces closed, in the event of a barrier fluid pressure failure, are thus transmitted first to the support ring and thence through the compressible seal ring to thus prevent hard face-to-face contact between the components and thus minimize the application of distortion-inducing forces to the face ring.

The improved seal of this invention, due to the structure and functional cooperations created by the bellows, minimizes or eliminates the secondary seal drag problem created when the secondary seal is defined by conventional O-rings, and the bellows is still able to accurately maintain a proper pressure balance diameter. The bellows enables the seal to operate with higher temperature process fluids without encountering problems of seal degradation or incompatibility with the process fluid, and can be constructed free of special end collars or the like and hence can be connected with the adjacent support ring and backing member solely through a fixed ringlike contact to simplify the construction and minimize undesired distortion forces, particularly on the seal ring. The overall seal can be manufactured in a very small and compact size so as to be particularly adaptable for mounting exteriorly of but directly adjacent the stuffing box of a pump, with the overall seal being effectively constructed preferably as a cartridge to facilitate its adaptation to the shaft of the pump.

Other objects and purposes of the invention will be apparent to persons familiar with structures of this general type upon reading the following specification and inspecting the accompanying drawings.

Figure 1:
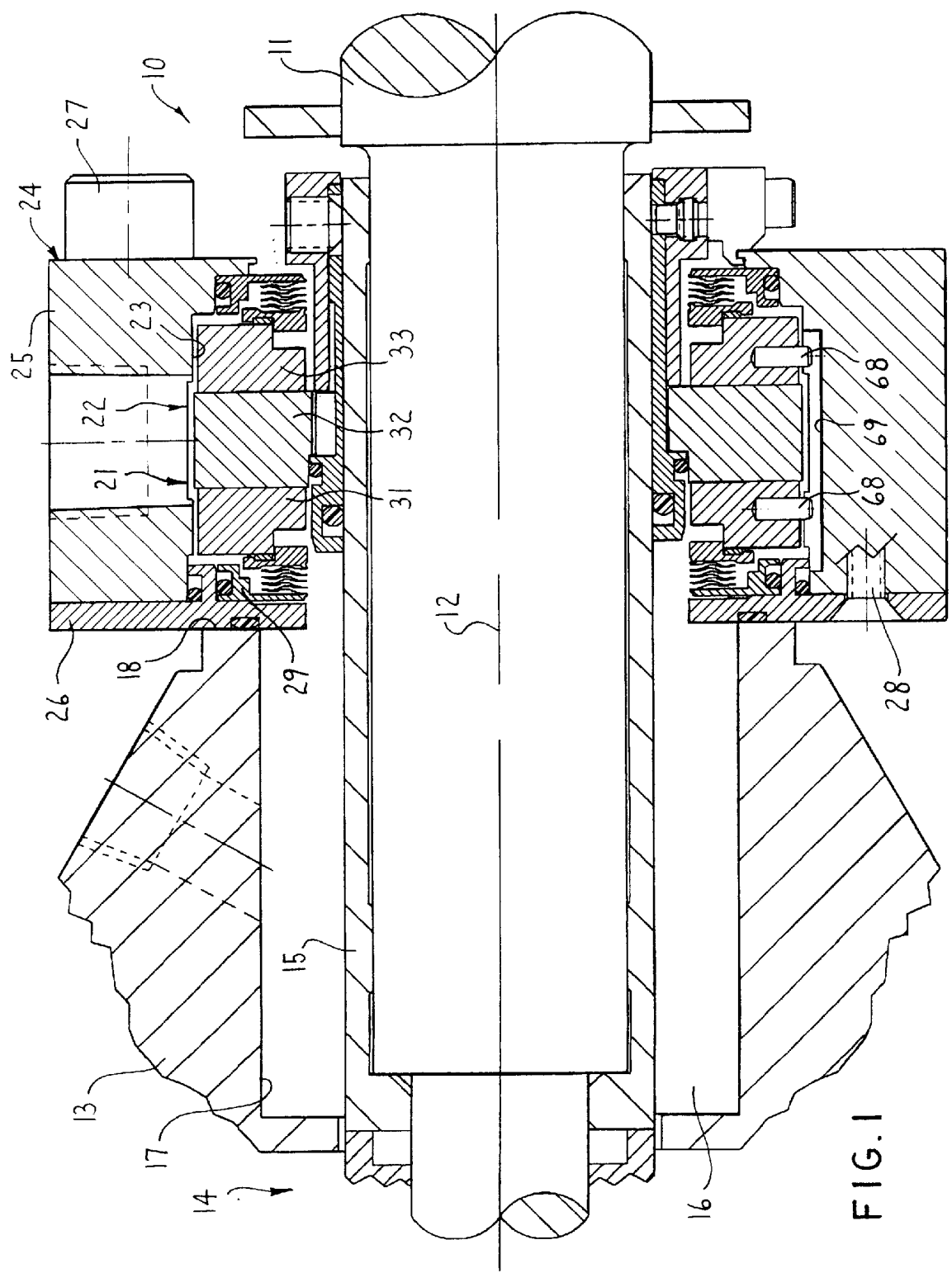
FIG. 1 a central cross-sectional view taken axially through the stuffing box of a small bore pump and showing the improved double seal of this invention.

Certain terminology will be used in the following description for convenience in reference only, and will not be limiting. For example, the words "upwardly", "downwardly", "rightwardly" and "leftwardly" will refer to directions in the drawings to which reference is made. The words "inward" and "outward", when used in conjunction with the pump, will refer to directions which are respectively inwardly of the stuffing box toward the pumping chamber and outwardly away therefrom. The words "inwardly" and "outwardly" will also refer to directions toward and away from, respectively, the geometric center of the overall seal assembly and designated parts thereof. Said terminology will include the words specifically mentioned, derivatives thereof, and words of similar import.

DETAILED DESCRIPTION

Referring to the drawings, and specifically FIG. 1, there is illustrated a double seal arrangement 10 according to the present invention. This seal arrangement is disposed in surrounding relationship to a shaft 11 which rotates about its axis 12, and which is rotatably supported on and projects outwardly from a housing 13 associated with a fluid handling device such as a pump 14. In the illustrated embodiment, the shaft 11 includes a surrounding shaft sleeve 15 fixed thereto. The housing 13 has a sleeve portion which defines therein an annular stuffing box or chamber 16 as disposed in surrounding relationship to the shaft 11. This stuffing box 16, in the illustrated embodiment, is for a small seal chamber pump, and the stuffing box is defined within an outer annular wall 17 defined by the pump housing. The improved double seal arrangement 10 of this invention is disposed so as to substantially abut an outer end 18 of the stuffing box housing so as to permit a sealing closure of the outer end of the stuffing box 16.

The double seal arrangement 10 includes axially inboard and outboard seal units 21 and 22, respectively, which are positioned within an annular chamber 23 which is defined generally by a gland structure 24 which is fixed to the pump housing 13 in surrounding relationship to the shaft 11. This gland structure 24 includes a main gland plate 25 which axially abuts an inner gland plate 26, the latter being sealingly engaged to an end face of the stuffing box housing. Suitable fasteners or screws 27 and 28 are provided for fixedly joining the gland plates 25 and 26 together, and for effecting securement thereof to the pump housing.

The inboard seal unit 21 includes a first annular seal ring (herein also referred to as the "first stator") 31 which rotatably surrounds the shaft 11 and cooperates with an axially adjacent second seal ring (herein also referred to as the "rotor") 32. The first seal ring 31 is nonrotatably secured relative to the surrounding gland plate, and the second seal ring 32 is rotatable due to its nonrotatable securement relative to the shaft. The outboard seal unit 22 is of similar construction in that it includes a third seal ring (herein also referred to as the "second stator") 33 which is nonrotatably secured relative to the gland structure and is disposed axially outwardly of the second seal ring 32. The third seal ring 33 cooperates with the second seal ring 32 to define the outboard seal unit.

More specifically, the inboard seal unit 21 includes flat and substantially planar ringlike seal faces 34 and 35 which are respectively defined on the seal rings 31 and 32 and are disposed on directly adjacent and axially opposed end faces thereof which extend in substantially perpendicular relation to the axis 12. At least one of these seal faces 34 and 35 is provided with a plurality of shallow grooves 36 formed therein, these grooves being formed in the seal face 35 of the rotating seal ring 32 in the illustrated embodiment. The grooves 36 in the illustrated embodiment project radially inwardly from the outer diameter of the interface between the seal faces 34, 35, with the inner ends of the grooves terminating in radially spaced relationship from the radially inner diameter of the seal face interface so as to define an annular nongrooved dam region 37 adjacent the radially inner end of the interface between the opposed seal faces 34 and 35. The grooves 36 are disposed in circumferentially spaced relation around the respective seal face, and typically are angled circumferentially as they project radially inwardly, commonly being referred to as spiral or angled grooves.

The outboard seal unit 22 is similarly constructed in that it includes annular ringlike seal faces 41 and 42 which are respectively defined on the seal rings 33 and 32 and are disposed on closely adjacent and directly opposed axial end surfaces thereof. The faces 41 and 42 are formed or configured in a known manner to create a hydrodynamic gas seal therebetween during relative rotation of the seal faces. For example, in the illustrated embodiment, one of the faces 41 and 42, the face 42 in the illustrated embodiment, is provided with shallow grooves 43 which are formed in the seal face in circumferentially spaced relation therearound, with these grooves 43 conventionally angling circumferentially as they project radially inwardly from the outer diameter of the interface between the seal faces 41 and 42. The grooves 43 are also separated from the inner diameter of this seal interface by a nongrooved annular dam 44.

The specific configuration of the seal faces 34–35 and 41–42, and of the grooves and dams associated therewith, is conventional and one example of a known seal face configuration for a gas seal is illustrated by U.S. Pat. No. 5,556,111, as owned by the Assignee hereof.

Other known face patterns, including a wavy face design (i.e., U.S. Pat. No. 4,836,561) can be provided on the faces of the seal rings.

The second seal ring 32 defines thereon an outer annular wall 45 which is of smaller diameter than and is spaced radially inwardly from the stepped inner annular wall 46 of the main gland plate 25, thereby defining an annular chamber 47 therebetween to which is supplied a pressured barrier fluid, normally a pressurized inert gas such as nitrogen. The main gland plate 25 has a supply port 48 associated therewith for communication with the barrier chamber 47, which supply port in turn connects to a suitable exterior system (not shown) for supplying pressurized gas to the barrier chamber. The arrangement for supplying a pressurized barrier gas to the barrier chamber is conventional, and further description thereof is believed unnecessary.

Figure 2:
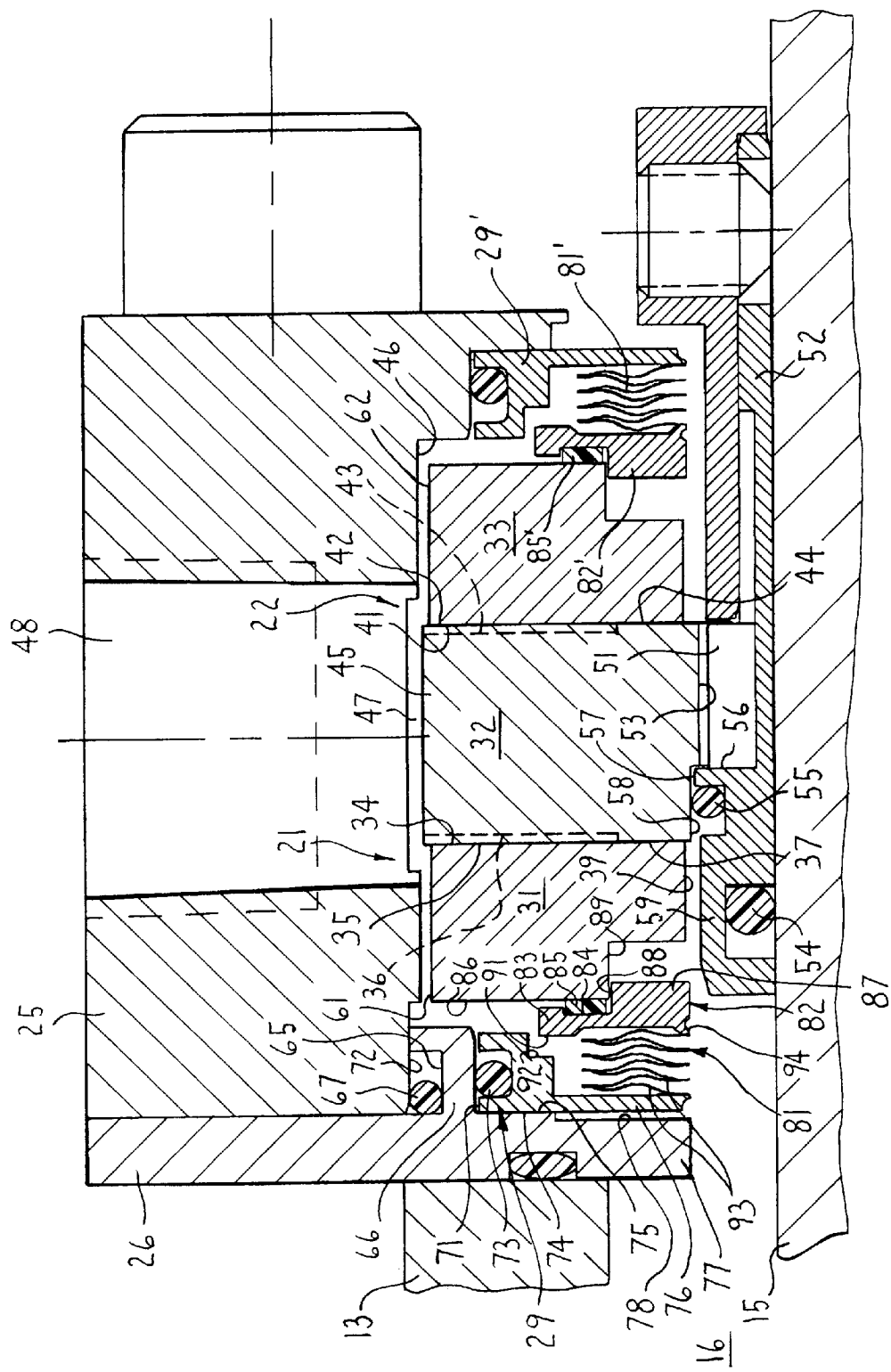
FIG. 2 is an enlarged sectional view showing part of the upper half of the seal of FIG. 1, the seal being shown in its normal operating position.

As illustrated by FIG. 2, the barrier chamber 47 is sufficiently axially elongated so as to extend axially over and in surrounding relation to the seal rings 31 and 33, whereby the barrier chamber thus communicates with the radially outer ends of the seal interfaces defined between the opposed seal faces 34–35 and 41–42. The barrier gas supplied to the barrier chamber 47 thus continuously communicates with the outer ends of the grooves 36 and 43 to permit creation of a gas seal between the opposed seal faces in a conventional manner.

To nonrotatably secure the seal ring or rotor 32 with respect to the shaft 11, the seal ring 32 has an axially extending slot 53 formed in the inner diameter thereof, and this slot accommodates therein a key 51 which is secured to an elongate shaft sleeve 52, the latter in turn being disposed in surrounding relationship to and nonrotatably secured to the shaft 11, such as by a set screw. An O-ring 54 is captivated within a groove formed in the shaft sleeve 52 to create a seal relationship between the shaft sleeve 52 and the shaft 11.

The rotor 32, intermediate the axial ends thereof, and adjacent the inner axial side (the left side in FIG. 2), has a radially inner stepped configuration defined by a annular wall or shoulder 57 which projects radially outwardly from the inner diameter and which in turn joins to an axially extending inner annular wall 58, the latter projecting axially for intersection with the end face 35. The recess or step defined by the walls 57 and 58 accommodates therein a radially raised annular hub 59 as defined on the shaft sleeve 52. This hub 59 defines thereon an inner annular end face 56 which directly axially opposes and abuts the shoulder 57 so as to securely axially position the rotor 32 to prevent axial outward movement thereof. This hub 59 also has an annular surrounding groove which opens radially outwardly and contains therein an elastomeric seal ring (i.e. an O-ring) 55, the latter maintaining a sealing engagement with the annular inner wall 58 of the rotor.

In a preferred embodiment, the diameter of the inner rotor wall 58 substantially corresponds to the diameter of the adjacent inner annular wall 39 of the inner stator 31, particularly the inner diameter of the seal face 34 formed thereon. This prevents imposition of undesired unbalanced axial forces on the rotor 32 by the process fluid.

The stators 31 and 33 respectively have outer annular walls 61 and 62 which are preferably spaced from the stepped inner annular wall 46 of the main gland plate 25.

The inner gland plate 26 includes thereon an annular flange 66 which projects axially and concentrically into the interior chamber of the main gland plate 25, and this annular flange 66 has a surrounding annular groove 65 in which there is confined an elastomeric seal ring (i.e., an O-ring) 67 which is maintained in sealing engagement with the inner annular wall 46 of the main gland plate 25.

Each of the stators 31 and 33 is nonrotatably secured but axially movable relative to the surrounding gland plate 25. For this purpose each stator 31 and 33 has a key or pin 68 fixed thereto and, in the illustrated embodiment, projecting radially outwardly thereof into an axially elongate slot 69 defined in the inner wall of the gland plate 25 so as to permit the stators to move axially relative to the gland plate.

The gland structure 24 also mounts thereon a backing member formed as an axially slidable annular pressure piston or pusher 29. In the illustrated embodiment of FIG. 2, this pusher 29 is of a generally H-shaped configuration when viewed in axial cross section, and includes a radially outer annular wall 71 which is concentrically and axially slidably supported on a radially inner annular wall 72 defined on the annular flange 66. The annular wall 71 has an annular groove formed therein for captivating an elastomeric seal ring (i.e. an O-ring) 73, the latter being maintained in sliding but sealing engagement with the opposed annular wall 72. The pusher 29 also has a generally radially inwardly extending rear wall 74 which is disposed in opposed relation to a front wall 75 formed on the intermediate gland plate 26. Under normal seal conditions, this rear wall 74 abuts the front wall 75 as shown in FIG. 2.

The pusher 29 also has an inner annular plate portion 76 which projects radially inwardly from the outer annular part 71, with the rear face of the plate part 76 being coplanar with the rear wall 74. The annular plate part 76 projects radially inwardly to an inner diameter which is similar in magnitude to the inner diameter of the stator 31. The gland plate 26 also has an inner annular portion 77 which projects radially inwardly substantially coextensively with and, in the illustrated embodiment, somewhat beyond the inner diameter of the plate part 76. The inner annular portion 77 of the gland plate 26 has a forwardly facing recessed wall 78 which is spaced rearwardly at least a small distance from the rear wall 74, even when the latter abuts the front wall 75 as shown in FIG. 2, to provide a clearance space between the opposed but spaced surfaces 74 and 78 for access by the pressurized process fluid.

The inboard seal unit 21 also includes an annular bellows 81 which is disposed in surrounding relationship to the shaft and which cooperates between the inner stator 31 and the gland structure, specifically the pusher 29, to define a seal therebetween which creates an isolation between the process fluid and the barrier fluid, and which also resiliently urges the first stator 31 axially outwardly (rightwardly in FIG. 2) toward the rotor 32.

The bellows 81 has one axial end thereof engaged with a rear end of a seal support member 82. The other axial end of the bellows 81 is engaged against a front end of the pusher 29.

The seal support member 82 is formed as a ring-shaped member having a radially outer portion 83 which, in the axially outwardly directed upper face thereof, is formed with an axially inwardly opening annular groove 84. This groove confines therein an annular seal ring or gasket 85 constructed of a suitable deformable sealing material, such as a material known as Kalrez. The seal ring or gasket 85 projects axially beyond the upper front face of the support ring portion 83 and provides an outer face adapted to be compressed into sealing engagement with a rear face 86 of the stator 31. The annular contact region between the gasket 85 and the rear face of the stator 31 is disposed approximately centrally between the radially inner and outer diameters of the stator and is positioned relative to the opposed seal faces 34 and 35 so as to provide the desired balance of pressures on the rotor due to the pressures imposed thereon by the barrier and process fluids.

The seal support member 82 also has a radially inner annular portion 87 which defines thereon an outer annular surface 88 which substantially defines the radially inner boundary of the groove 84 and which projects axially outwardly a substantial distance beyond the gasket 85. This radially inner annular port on 87 projects axially into an annular step which is formed in the rear inner corner of the stator 31, which step is defined by an inner annular wall 89 on the stator, the latter being disposed substantially in axial slidable engagement with the annular surface 88 defined on the support member 82. Due to this engagement between the surfaces 88 and 89, the support member 82 effectively supports and centers the stator 31 while enabling it to be urged axially toward the rotor 32.

The radially outer portion 3 of support member 82 also has a rearwardly-facing annular face 91 formed thereon, the latter being defined generally within a radial plane. This latter face 91 is normally spaced a predetermined distance from an axially opposed annular face 92 which also extends radially and is defined on the front face of the pusher 29. The face 92 is adapted to move into abutting engagement with the opposed face 91 in the event of a loss of barrier fluid pressure, as explained hereinafter.

Considering now the construction of the bellows 81, it is formed by a small number of convolutions, preferably between about three and five convolutions, FIG. 1 illustrates the bellows formed of four convolutions. Each convolution is formed by two substantially identical annular bellows plates or leaflets 93 which are each generally of a somewhat truncated conical configuration. The two plates defining each convolution have the radially outer edges disposed in axially abutting relationship and suitably welded together around the entire annular periphery thereof to integrally and sealingly join the two plates. The two plates defining each convolution are themselves imperforate so as to be capable of creating a seal between the regions disposed on opposite sides thereof. In similar fashion, the radially inner edges of the adjacent plates of adjacent convolutions are disposed in axially abutting relation and are suitably welded together around the entire inner annular periphery thereof to integrally and sealingly join the plates of adjacent convolutions together. The radially inner edge of the outermost leaflet is fixedly and sealingly joined, as by welding, around the entire inner periphery thereof to a suitable securing flange 94 which is provided on the rear of the seal support member 82 adjacent the inner diameter thereof. In similar fashion the radially inner edge of the leaflet at the other end of the bellows is fixedly and sealingly secured, as by welding, around the entire periphery thereof to the adjacent face of the pusher plate part 76 in close proximity to the inner diameter of the latter. The resulting bellows 81 is thus axially short and compact, and has opposite ends thereof fixedly and sealingly joined to the pusher 29 and the seal support member 82, whereby these latter rings and their fixed securement to the bellows 81 thus define a cartridge-like bellows unit which can be easily assembled into the seal assembly and which occupies minimal space so as to permit the overall seal assembly to be of compact length. The bellows reacts at the inner end through the pusher 29 onto the stationary gland plate 26, and the axial resiliency of the bellows is thus exerted outwardly onto the seal support member 82, and is applied axially to the stator 31 solely through the compressible seal ring or gasket 85.

IN will be appreciated that each plate of the bellows can be either of single or multi-ply construction formed by overlying and laminating together one or more individually shaped metal plys or plates, the latter being very thin and readily formable.

The overall construction of the bellows is believed obvious to those of ordinary skill in bellows technology, and further detailed description thereof is believed unnecessary.

When the bellows 81 is positioned for cooperation within the inboard seal unit substantially as illustrated by FIG. 2, the bellows is disposed so that the outer diameter thereof is similar in magnitude to the diameter of the seal ring or gasket 85, and this thus positions the mean effective diameter of the bellows radially inwardly of the gasket 85 so as to provide for optimum balance of pressures on the seal components.

The construction of the bellows 81 provides the overall bellows with an axial length which is normally somewhat smaller than its radial dimension, as measured between the radially outer and inner diameters, thus providing a very small and compact structure.

Because the inner annular region adjacent the bellows 81 is exposed to the process fluid pressure, whereas the outer annular region of the bellows is exposed to the barrier pressure, the balance diameter of the seal (sometimes referred to as the mean effective diameter) with respect to the imposition of barrier and process fluid pressures on the stator 31 is thus defined approximately radially midway between the radially outer and inner diameters of the bellows, which balance diameter for the bellows can be accurately defined and, when so defined, can be maintained with a high degree of precision in view of the manner in which the bellows is formed and confined within the inboard seal unit 21.

In addition, the bellows 81 and support ring 82 are positioned such that the sealing or contact point with the stator 31, which sealing or contact point occurs at the gasket 85, is positioned so as to be disposed either at or radially inwardly of the centroid of the stator 31 so as to maintain proper convergence of the seal faces 34–35 toward the seal dam 37 therebetween.

Further, the inner diameter of the gasket 85 is preferably located at or radially outwardly of the mean effective diameter (MED or approximately mid-span) of the bellows 81 for proper sealing.

The outboard seal unit 22 is, in the illustrated and preferred embodiment, constructed substantially identically to the inboard seal unit 21. The outboard seal unit 22 includes a bellows unit which cooperates between the main gland plate 25 and the outboard stator 33. The construction of this latter bellows unit and its cooperation is substantially the same as the inboard bellows unit, and hence parts of the outboard bellows unit are designated by the same reference numerals used to designate corresponding parts of the inboard bellows unit but with addition of a prime (') thereto. Further description of the outboard bellows unit is thus believed unnecessary.

Figure 3:
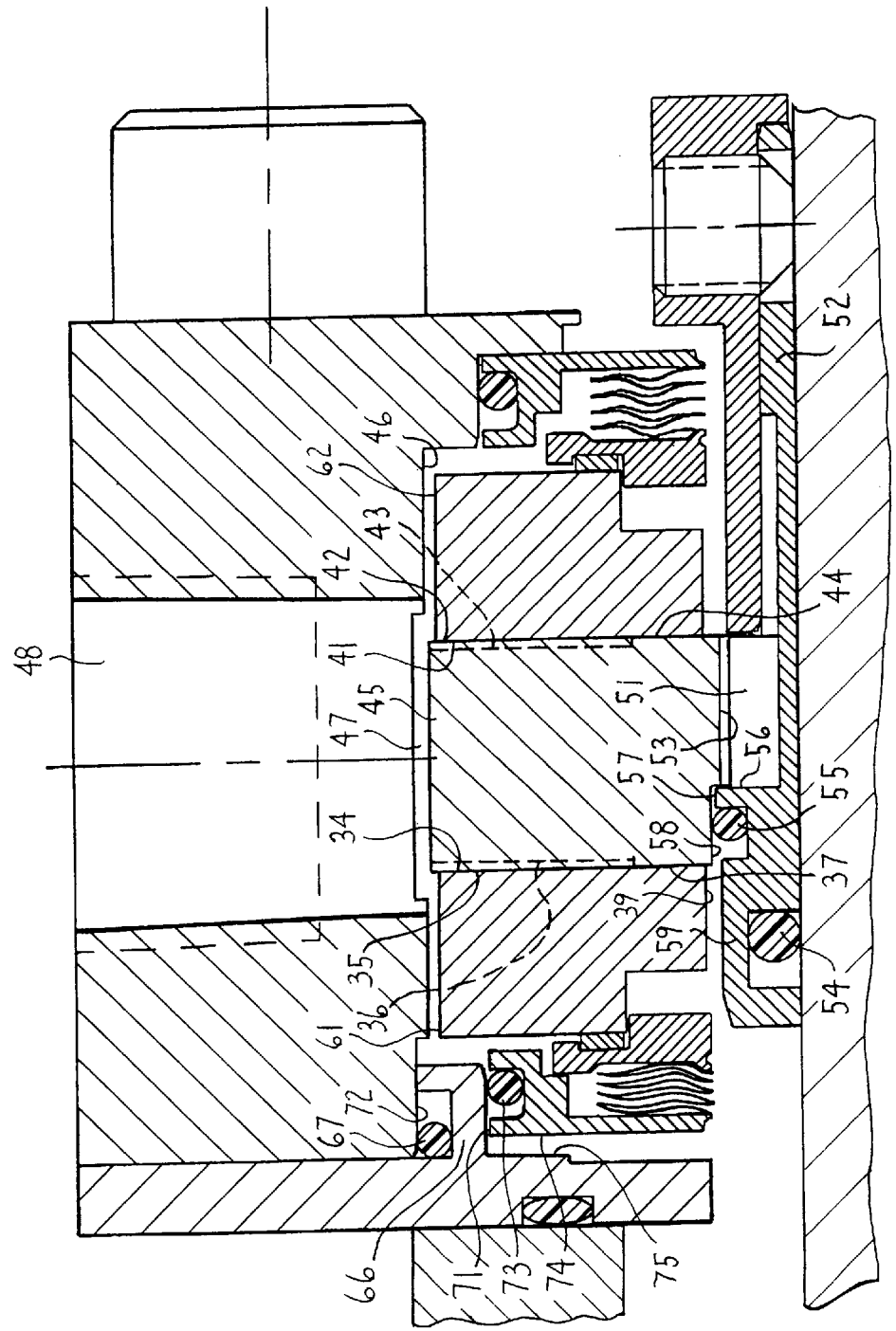
FIG. 3 is a view similar to FIG. 2 but showing the position of the seal when a pressure reversal occurs, that is, in the absence of the barrier fluid pressure.

In the construction of the preferred embodiment of the seal arrangement as illustrated by FIGS. 2 and 3, and particularly when the seal is in the normal operating condition of FIG. 2 wherein the pusher 29 abuts against the inner gland plate 26, the support ring 82 and pusher 29 have opposed and axially aligned end faces 91 and 92 which are axially spaced by a relatively small distance. This axial spacing between the opposed and aligned annular end faces 91 and 92 represents the minimal axial spacing between the support ring 82 and pusher 29 when in this normal seal condition, and this axial spacing is also significantly less than the axial extent of the bellows 81 which extends between the opposed parts 76 and 87. The spacing between faces 91 and 92 is also less than the spacing between pusher 29 and the rear face of the stator 31. Accordingly, in the event of a loss of barrier fluid pressure in the chamber 47, then the pressure of the process fluid acting on the rear face of the pusher 29 slides the pusher 29 axially outwardly until the face 92 contacts the face 91 on the support ring 81 as illustrated in FIG. 3. All of the axially directed process fluid force is then transferred from the pusher 29 through the faces 91–92 to the support ring 82, and thence onto and through the deformable gasket or seal ring 85 for application to the rear face of the stator 31. This process fluid thus acts to increase the sealing engagement which exists at the seal ring or gasket 85 so that the latter is maintained in proper sealed engagement with both the rear face of the stator 31 and the front face of the support ring 82, thereby preventing outward escape of process fluid past the seal ring or gasket. Further, this increased force from the process fluid as imposed on the gasket and as transmitted to the stator 31 is all applied to the stator at a desired and predetermined central location, and is applied through a soft contact region, namely the contact region created by the seal ring or gasket 85, thereby avoiding face-to-face contact between opposed hard faces and significantly minimizing undesired or unacceptable distortion of the stator 31.

Operation

The operation of the improved mechanical seal arrangement 10 of this invention, particularly with respect to the embodiment as illustrated by FIGS. 2 and 3, will now be briefly described.

Under normal seal operation, the seal arrangement 10 will be disposed substantially as illustrated in FIG. 2. A barrier fluid such as an inert gas will be supplied to the barrier fluid chamber 47 and hence will flow past the exteriors of the stators 31 and 33 so that the barrier fluid surrounds bellows 81 and 81' and also accesses the grooves 36 and 43 formed in the seal faces defined adjacent opposite ends of the rotor 32. In addition, the process fluid of the pump will normally be present in the stuffing box chamber 16 as well as within the interior annular region defined within the inboard seal unit 21, which process fluid is prevented from escaping due to the seal rings 55 and 85, the bellows 81, and the direct contact between the opposed seal faces 34 and 35, particularly contact at the seal dam 37 when the shaft 11 is stationary or is rotating only at low speed. The pressure of the inert gas supplied to the barrier chamber 47 will typically be higher than the pressure of the process fluid, normally in the range of at least 25 to 50 psi higher. As an example, since the process fluid in small bore pumps typically does not exceed 300 psi, the pressure of the barrier gas may be as high as 350 psi so that the barrier gas pressure will always be higher than the process fluid pressure.

When the pump is in operation and the speed reaches higher rotational limits, the barrier gas is pumped by the rotation of the rotor 32 into the face grooves 36 and 43 to create a hydrodynamic pressure which effectively acts between the opposed seal faces and effects a slight separation between the opposed seal faces, which separation is permitted due to axial movement of the stators 31 and 33 against the urging of the respective bellows 81 and 81'. The inert gas thus effectively creates a seal between the opposed seal faces, such as 34–35, the latter now typically being maintained out of contact with one another, and the higher pressure of the barrier gas is such that if any leakage of fluid occurs radially across the opposed seal faces 34–35, then such leakage is in the form of inert gas in small quantities leaking radially inwardly into the process fluid, whereby leakage of process fluid to the surrounding environment can be effectively prevented. The operation of the gas seal as created between the opposed seal faces is conventional and well known, and further description thereof is believed unnecessary.

During operation of the pump, the bellows 81 is not subject to rotation since it is engaged axially between the nonrotatable pusher 29 and support ring 82, and hence is subject only to limited axial compression due to axial movement of the stator 31 caused by the lift-off thereof from the rotor 32 as explained above. The bellows 81 always exerts an axial biasing force urging the stator 31 toward the rotor 32. The axial biasing force of the bellows 81 is, at all times, applied in its entirety to the stator 31 through the deformable seal ring or gasket 85, thereby providing for a "soft" transfer of force to the stator 31, and at the same time controlling the application of this force to a desired location on the stator. This, in conjunction with the sizing and positioning of the bellows and the gasket, thus permit the pressure balance diameter between the barrier and process fluids to be originally calculated and accurately maintained in operation, whereby the application of forces to the stator 31 by the barrier and process fluids can be desirably balanced in a manner well known in the seal art so as to maintain only the desired pressures thereon so as to not disrupt the desired cooperation between the opposed seal faces 34 and 35.

If during operation the supply of barrier gas to the chamber 47 is interrupted so that the pressure in the barrier chamber 47 is decreased below process fluid pressure, or if the product fluid pressure improperly exceeds the barrier fluid pressure, then the process fluid pressure acting against the rear faces of the pusher 29 will slidably move the pusher axially outwardly into the position illustrated by FIG. 3 so that the face 92 on the pusher directly contacts the opposed rear face 91 of the support ring 82 to increase the sealing pressure at the gasket 85 to prevent escape of process fluid outwardly past the gasket, and to apply a force urging the stator 31 toward the rotor 32 to also effectively maintain a seal therebetween to prevent escape of process fluid.

It will be appreciated that the configuration of the face grooves 36 and 43 as provided on the rotor 32 can assume many variations, and in fast can be of different configurations if desired, depending upon the properties of the gas seal desired. Further, the grooves can be provided on the stators, rather than the rotor, if desired since such is also a known practice.

Figure 4:
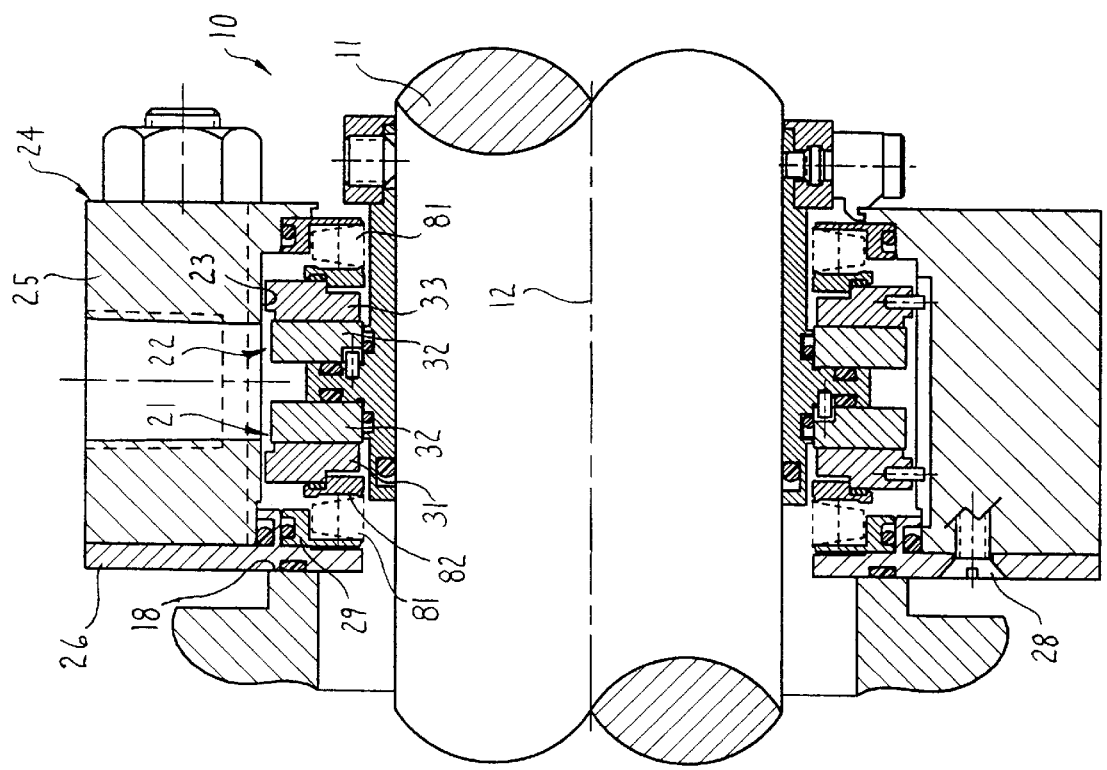
FIG. 4 is a view similar to FIG. 1 but showing a variation thereof.

While the invention as illustrated by the drawings depicts a double seal wherein a common rotor is utilized having the seal faces defined on opposite axial sides thereof, it will be appreciated that the single two-sided rotor 32 (FIGS. 1–3) can be replaced by two individual rotors, each having a single seal face thereon for cooperation with its respective stator, as shown in FIG. 4. The use of a single shared rotor, as in the illustrated embodiment, is preferred however so as to enable the overall seal arrangement to have the extremely compact size and configuration which is highly desirable to permit it adaption in small spaces, such as adjacent the stuffing box of a small bore pump.

Merely as illustrative, and not limiting, it should be noted that the desirable common-rotor seal arrangement illustrated by FIGS. 1 and 2 will preferably have an overall axial length of less than about 2½ inches, and the radial dimension of the seal (i.e., maximum seal radius minus shaft radius) will normally be no greater than about 1½ inches.

By use of a simple and compact bellows for creating a secondary seal with the stator, which bellows also functions as a spring to provide the necessary axial resilient bias, not only is the overall construction simplified, but the problems of seal hang-up, temperature breakdown, and chemical incompatibility such as are commonly experienced when using O-rings as secondary seals are hence effectively eliminated or at least greatly minimized. At the same time, many of the undesirable problems caused by the use of prior bellows, namely the use of axially long multi-convolution bellows, including the inability of such long multi-convolution bellows to maintain an accurate pressure diameter, and the complex end flanges and the stresses and distortions caused by mounting of the bellows, are also effectively eliminated by the extremely compact and simplified arrangement illustrated and described herein.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a double gas seal arrangement for creating a sealing relationship between a shaft rotatable about an axis and a stuffing box housing which substantially concentrically surrounds the shaft and is part of a process fluid handling device, said seal arrangement including a gland structure fixed to said housing in surrounding relationship to said shaft, inboard and outboard seal units disposed within said gland structure in surrounding relation to said shaft and in axially adjacent relationship to one another, said inboard seal unit including rotor means nonrotatably coupled to the shaft and a first stator nonrotatably coupled relative to the gland structure and defining a first pair of axially opposed seal faces, and said outboard seal unit including rotor means nonrotatably coupled to the shaft and a second stator nonrotatably coupled to the gland structure and defining thereon a second pair of axially opposed seal faces, an annular chamber for a pressurized barrier fluid defined within said gland structure in surrounding relationship to said seal units, and an annular bellow unit positioned in surrounding relation to said shaft and extending axially between said first stator and said gland structure for resiliently urging the first stator axially toward its respective rotor means, said bellows unit defining a process fluid chamber interiorly thereof, said bellows unit separating said barrier fluid chamber from the process fluid chamber, comprising the improvement wherein said bellows unit is defined by an axially oriented and axially flexible bellows which at an outer end is sealingly coupled to a support ring and at an inner end is sealingly coupled to a backing ring, said backing ring having a first annular backing face which is oriented axially away from the bellows and is normally maintained in stationary abutting engagement with an opposed stationary face of said gland structure, said backing ring having a second annular backing face which is also oriented axially away from said bellows and is exposed to a process fluid so that the process fluid exerts a pressure force on the backing ring in a direction axially toward said first stator, said support ring being positioned closely axially adjacent a rear face of said first stator, an annular sealing ring of a deformable material disposed axially between said support ring and said rear face in surrounding relationship to said shaft for creating a sealed engagement with said rear face and said support ring to effect sealing isolation between said barrier fluid chamber and said process fluid chamber, said annular sealing ring maintaining axially opposed surfaces of said support ring and said first stator in axially spaced relation, said support ring defining thereon a first annular contact surface which is defined exteriorly of said bellow; and faces axially toward said backing ring, said backing ring defining thereon a second annular contact surface which is also disposed exteriorly of said bellows and faces axially toward said first contact surface in opposed relation therewith, said first and second contact surfaces being axially spaced apart when said first backing face is engaged against the stationary face of said gland structure due to presence of barrier fluid pressure in said barrier chamber, said backing ring being axially movable toward said first stator until said second contact surface on said backing ring directly axially abuts said first contact surface on said support ring in the absence of barrier fluid pressure in said barrier chamber, whereby pressure imposed on said backing ring by said process fluid is transmitted through said backing ring directly into said support ring and thence through said annular sealing ring to said first stator.

2. A seal arrangement according to claim 1, wherein said support ring includes an inner annular part which is positioned radially inwardly of said annular sealing ring and which projects axially toward and into an annular bore formed by said first stator, said first stator defining thereon a substantially cylindrical surface which closely surrounds and is axially slidably supported relative to the inner annular part of said support ring so that said support ring provides primary centering support for said first stator relative to said shaft.

3. A seal arrangement according to claim 2, wherein said support ring includes an annular groove formed axially inwardly from a front face thereof, said annular groove being disposed closely adjacent but radially outwardly of said inner annular part, said annular sealing ring being confined in said groove and projecting axially outwardly thereof for sealing contact with the rear face of the first stator.

4. A seal arrangement according to claim 1, wherein said bellows includes a maximum of five axially-joined convolutions each defined by two axially-joined bellows plates so that the overall bellows is of short axial length.

5. A seal arrangement according to claim 1, wherein said bellows is connected at its inner diameter to said support ring, and is also connected at its inner diameter to said backing ring.

6. A seal arrangement according to claim 5, wherein said backing ring includes an outer annular portion which is axially slidably supported on said gland structure and defines thereon said first backing face which is normally in abutting engagement with said gland structure, said backing ring including an inner platelike annular portion which is joined to and projects radially inwardly from said outer annular portion and which terminates at a radially inner edge which is of a diameter of similar magnitude to an inner diameter of said bellows, said inner platelike annular portion projecting radially inwardly past the inner end of said bellows so that the inner end of said bellows adjacent the inner diameter thereof is fixedly secured directly to said inner platelike annular portion adjacent the radially inner edge thereof.

7. A seal arrangement according to claim 6, wherein said outer annular portion define therein a surrounding annular groove which opens radially outwardly toward an opposed annular cylindrical surface defined on said gland structure, and an elastomeric annular sealing ring positioned within said groove for sealing engagement between said opposed cylindrical surface of said gland structure and said outer annular portion of said backing ring.

8. A seal arrangement according to claim 6, wherein said gland structure includes an annular gland plate which surrounds the shaft and projects radially inwardly so as to terminate at an inner diameter which is disposed closely adjacent but spaced radially outwardly from said shaft, said gland plate being disposed axially adjacent but inwardly of said backing ring, said gland plate defining thereon a substantially radially planar surface which defines said stationary face, and the inner platelike annular portion of said backing ring defining on a back side thereof said second backing face with the second backing face being axially spaced from said stationary face so that said second backing face is always spaced at least a small axial distance from the opposed stationary face of the gland plate even when said first backing face abuts said stationary face so as to permit process fluid to enter the space adjacent said second backing face.

9. A seal arrangement according to claim 1, wherein said support ring has an annular groove formed axially inwardly therefrom a front face thereof, said annular sealing ring being radially and axially confined within said groove and projecting axially outwardly therefrom for sealing contact with the rear face of said first stator.

10. A seal arrangement according to claim 9, wherein said annular sealing ring creates an annular sealing contact with the rear face of the first stator at a diameter which is substantially the same as or smaller than the diameter defined by the centroid of the first stator.

11. A seal arrangement according to claim 1, wherein the inner diameter of the annular sealing ring approximately equals or is greater than the mean effective diameter of the bellows.

12. In a double seal arrangement for creating a sealing relationship between a shaft rotatable about an axis and a stuffing box structure which substantially concentrically surrounds the shaft and is part of a process fluid handling device, a gland structure fixed to said box structure in surrounding relationship to said shaft, axially inboard and outboard seal units disposed within said gland structure in surrounding relation to said shaft, each said seal unit including rotor means nonrotatably coupled to the sheet and a stator nonrotatably coupled relative to the gland structure and defining a pair of axially opposed seal faces, a chamber for a first pressurized fluid defined within said structures in surrounding relationship to at least one said seal unit, and an annular bellows unit positioned in surrounding relation to said shaft and extending axially between one said stator of said one seal unit and one of said structures for resiliently urging said one stator axially toward its respective rotor means, said bellows unit defining a chamber for a second pressurized fluid interiorly thereof, said bellows unit separating said first fluid chamber from the second fluid chamber, comprising the improvement wherein said bellows unit is defined by an axially oriented and axially flexible bellows which at one end is sealingly coupled to a support ring and at its other end is sealingly coupled to a backing ring, said backing ring having a first backing face oriented axially away from the bellows and normally maintained in stationary abutting engagement with an opposed stationary face on one of said structures, said backing ring having a second backing face oriented axially away from said bellows and exposed to one of the fluids so that the one fluid exerts a pressure force on the backing ring axially toward said one stator, said support ring being positioned axially adjacent a rear face of said one stator, an annular deformable sealing ring disposed axially between and maintained in sealed engagement with said support ring and said rear face in surrounding relationship to said shaft to effect sealing isolation between said chambers, said annular sealing ring maintaining axially opposed surfaces of said support ring and said one stator in axially spaced relation, said support ring defining thereon a first contact surface which faces axially toward said backing ring, said backing ring defining thereon a second contact surface which faces axially toward said first contact surface in opposed relation therewith, said first and second contact surfaces being axially spaced apart when said first backing face is engaged against the stationary face of said one structure, said backing ring being axially movable toward said one stator until said second contact surface axially abuts said first contact surface in the event of an improper pressure relationship between said first and second fluid chambers, whereby fluid pressure imposed by the one fluid on said backing ring is transmitted directly into said support ring and thence through said annular sealing ring to said one stator.

13. A seal arrangement according to claim 12, wherein said support ring includes an annular part which projects axially toward and into an annular bore formed by said one stator, said one stator defining thereon a substantially cylindrical surface which is axially slidably supported on said annular part of said support ring so that said support ring provides primary centering support for said one stator relative to said shaft.

14. A seal arrangement according to claim 13, wherein said support ring includes an annular groove formed axially inwardly from a front face thereof, said annular sealing ring being confined in said groove and projecting axially outwardly thereof for sealing contact with the rear face of said one stator.

15. A seal arrangement according to claim 12, wherein said bellows includes a maximum of five axially-joined convolutions each defined by two axially-joined bellows plates so that the overall bellows is of short axial length.

16. A mechanical seal arrangement for creating a sealing relationship between a shaft rotatable about an axis and rotatably supported on and projecting outwardly off a stuffing box housing which substantially concentrically surrounds the shaft, said sealing arrangement including first and second seal rings which concentrically surround the shaft and have axially opposed seal faces for creating a sealed engagement therebetween, one of said seal rings being nonrotatably secured relative to the surrounding housing, the other seal ring being nonrotatably secured relative to the shaft, and an axially elongate bellows unit for axially urging said one seal ring toward the other said seal ring, said bellows unit including an axially flexible bellows having a support ring fixedly and sealingly joined to one axial end thereof, said support ring being disposed in nonrotatable but axially slidable supportive engagement with said one seal ring, and an annular deformable sealing element positioned axially between and maintained in sealing engagement between a rear face of said one sealing ring and a front face of said support ring to sealingly isolate a process fluid from the surrounding environment, said bellows at the other end thereof being sealingly engaged to a backing ring which is normally maintained in axially stationary abutting engagement with an axially stationary abutment member, said backing ring having a backing face thereon which faces away from said bellows and is exposed to the process fluid, said backing ring and said support ring respectively having first and second annular contact faces which are disposed in spaced and axially opposed relation under normal seal operation, said backing ring being movable by the process fluid axially toward said support ring to cause direct abutting contact between said first and second contact faces to increase the sealing pressure between the annular sealing element and he rear face of said one seal ring.

17. A seal arrangement according to claim 16, wherein said backing ring includes an outer annular portion which is axially slidably supported on the stationary abutment member and defines thereon said backing face which is normally in abutting engagement with the stationary abutment member, said backing ring including an inner platelike annular portion which is joined to and projects radially inwardly from said outer annular portion and which terminates at a radially inner edge which is of a diameter of similar magnitude to an inner diameter of said bellows, said inner platelike annular portion projecting radially inwardly past an inner end of said bellows so that the inner end of said bellows adjacent the inner diameter thereof is fixedly secured directly to said inner platelike annular portion adjacent the radially inner edge thereof.

18. A seal arrangement according to claim 17, wherein said outer annular portion defines therein a surrounding annular groove which opens radially outwardly toward an opposed annular cylindrical surface defined on the stationary abutment member, and an elastomeric annular sealing ring positioned within said groove for sealing engagement between the opposed cylindrical surface of the stationary abutment member and said outer annular portion of said backing ring.

19. A seal arrangement according to claim 16, wherein said annular sealing element creates an annular sealing contact with the rear face of said one seal ring at a diameter which is substantially the same as or smaller than the diameter defined by the centroid of said one seal ring.

20. A seal arrangement according to claim 16, wherein the inner diameter of the annular sealing element approximately equals or is greater than the mean effective diameter of the bellows.

21. A seal arrangement according to claim 16, wherein said support ring includes an annular part which projects axially toward and into an annular bore formed by said one seal ring, said one seal ring defining thereon a substantially cylindrical surface which is axially slidably supported on said annular part of said support ring so that said support ring provides primary centering support for said one seal ring relative to said shaft.

\* \* \* \* \*

UNITED STATES PATENT AND TRADEMARK OFFICE
CERTIFICATE OF CORRECTION

PATENT NO. : 5,924,697
DATED : July 20, 1999
INVENTOR(S) : Joseph C. Parker et al It is certified that error appears in the above-identified patent and that said Letters Patent is hereby corrected as shown below:

Column 12, line 24; change "bellow" to ---bellows---.
Column 12, line 53; change "bellow" to ---bellows---.
Column 13, line 44; change "define" to ---defines---.
Column 14, line 23; change "sheet" to ---shaft---.
Column 16, line 4; change "he" to ---the---.

Signed and Sealed this

Fourth Day of January, 2000

Attest:

Attesting Officer

Acting Commissioner of Patents and Trademarks